US010127744B2

(12) United States Patent
Butler

(10) Patent No.: US 10,127,744 B2
(45) Date of Patent: Nov. 13, 2018

(54) QUEUE MANAGEMENT SYSTEM

(71) Applicant: ACCESSO TECHNOLOGY GROUP, PLC, Twyford Berkshire (GB)

(72) Inventor: Christopher Butler, Oxfordshire (GB)

( * ) Notice: Subject to any disclaimer, the term of this patent is extended or adjusted under 35 U.S.C. 154(b) by 805 days.

(21) Appl. No.: 14/421,795

(22) PCT Filed: Aug. 13, 2013

(86) PCT No.: PCT/GB2013/052152
§ 371 (c)(1),
(2) Date: Feb. 13, 2015

(87) PCT Pub. No.: WO2014/027191
PCT Pub. Date: Feb. 20, 2014

(65) Prior Publication Data

US 2015/0193997 A1 Jul. 9, 2015

(30) Foreign Application Priority Data

Aug. 13, 2012 (GB) .................................. 1214432.5

(51) Int. Cl.

| | |
|---|---|
| ***G07C 11/00*** | (2006.01) |
| ***B60R 25/04*** | (2013.01) |
| ***B60R 25/24*** | (2013.01) |
| ***G07C 9/00*** | (2006.01) |

(52) U.S. Cl.
CPC .......... *G07C 9/00007* (2013.01); *G07C 11/00* (2013.01); *G07C 2011/04* (2013.01)

(58) Field of Classification Search
CPC ................................................. G07C 9/00007
See application file for complete search history.

(56) References Cited

U.S. PATENT DOCUMENTS

| | | | | |
|---|---|---|---|---|
| 5,953,707 A * | 9/1999 | Huang | G06Q 10/06 705/7.25 |
| 7,716,077 B1 * | 5/2010 | Mikurak | G06Q 10/06 705/7.12 |
| 2004/0100390 A1 | 5/2004 | Giraldin et al. | |
| 2007/0203763 A1 * | 8/2007 | Ackley | G06Q 10/00 705/5 |

(Continued)

FOREIGN PATENT DOCUMENTS

| | | |
|---|---|---|
| CN | 1936944 A | 3/2007 |
| CN | 102209977 | 10/2011 |

(Continued)

OTHER PUBLICATIONS

First Office Action from Chinese Patent Application No. 201380047906.2, dated Mar. 24, 2016.

(Continued)

*Primary Examiner* — Emily C Terrell
*Assistant Examiner* — Pameshanand Mahase
(74) *Attorney, Agent, or Firm* — Koppel, Patrick, Heybl & Philpott

(57) ABSTRACT

A system for regulating access to a resource by a plurality of users, comprises: a plurality of portable access keys, each being provided to one of the plurality of users and having an eligibility level associated therewith; a standard access queue allowing access to the resource by all users at a standard access rate; a premium access barrier allowing access to the resource at a premium access rate for users in a premium access queue, separate from the standard access queue; and a queue manager for managing the premium access queue by receiving a request from a user wishing to access the resource via the premium access queue, allowing the user to access the resource via the premium access barrier if the eligibility level associated with the user's (Continued)

portable access key meets an eligibility threshold, determining an access queue characteristic and setting the eligibility threshold based on the determined access queue characteristic.

15 Claims, 1 Drawing Sheet

(56) References Cited

U.S. PATENT DOCUMENTS

| | | | | |
|---|---|---|---|---|
| 2007/0286220 | A1 | 12/2007 | Stenning | |
| 2012/0116789 | A1 | 5/2012 | Boss et al. | |
| 2013/0290656 | A1 * | 10/2013 | Staelin | G06F 13/18 711/158 |

FOREIGN PATENT DOCUMENTS

| | | | | |
|---|---|---|---|---|
| WO | WO 03/034350 | A2 | 4/2003 | |
| WO | WO 2011/141561 | * | 11/2011 | G06Q 10/00 |
| WO | WO 2011/141561 | A1 | 11/2011 | |

OTHER PUBLICATIONS

Written Opinion of the International Searching Authority and International Search Report for PCT/GB2013/052152 dated Nov. 7, 2013.

United Kingdom Search Report for GB1214432.5 dated Dec. 13, 2012.

* cited by examiner

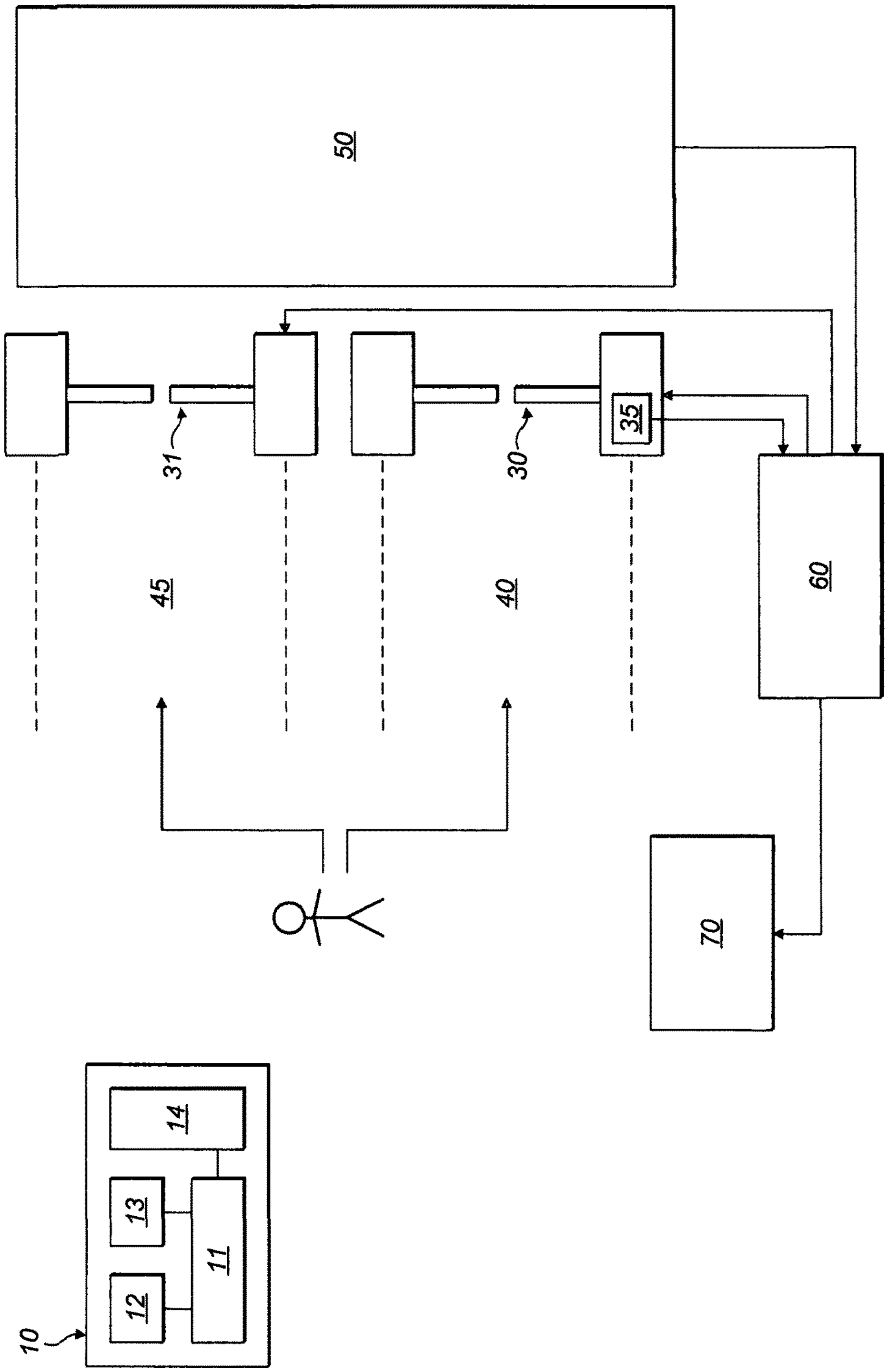
50
31
30
35
45
40
60
70
10
14
13
11
12

QUEUE MANAGEMENT SYSTEM

TECHNICAL FIELD OF THE INVENTION

The present invention relates to systems and method for regulating access by a plurality of users to a resource, such as an attraction, ride, show or event, as may be found in an amusement park.

BACKGROUND TO THE INVENTION

An amusement park comprises a number of attractions, for example, rides, shows and displays. Each attraction has a limited capacity for people to gain access to it at any specific time. For instance, a ride has only a certain number of seats. It is desirable that access be managed to use the attraction as efficiently as possible and that any regulation of access should be deemed as fair to all users. When more people wish to access the attraction than its instantaneous capacity allows, people who are unable to gain access immediately can be queued.

Physical queue lines are a well known way to manage access. However, the most popular attractions tend to have longer queues for access than less popular attractions. Moreover, potential users of an attraction may become bored queuing in a line. Managing access to a resource efficiently whilst minimising the length of queue line is difficult.

One existing approach divides the people who wish to access the attraction into two groups. A first group is arranged into a physical queue at a first access point for the attraction. Each member of the second group of people is informed of an allotted time slot when they can access the attraction. In order to access the attraction, a member of the second group need only be physically present at a second access point for the attraction, at their allotted time slot. Examples of such approaches include U.S. Pat. No. 6,529,786 and US-A-2008/0080445, both of which share common inventors with the present invention.

An alternative approach was described in WO-2010/055286, WO-2011/141561, US-2010/117790 and US-2010/0277276. Again, these share common inventors with the present invention. In these approaches, each person has a portable access key, such as an electronic module, a portable computer or mobile telephone with appropriate software or a paper ticket. Each portable access key has an associated eligibility level and each attraction has an eligibility threshold. These can both be represented by numbers. A person can access the attraction via that attraction's access queue, only if their eligibility level meets the threshold. The eligibility level for a portable access key increases over time, provided that the user of the portable access key does not access an attraction. The eligibility threshold is then set based on the size of a physical or virtual queue for the attraction.

This newer methodology offers significant benefits to both the users and attraction operator. The operator can control the size of the queue by setting the eligibility threshold accordingly, for example by increasing the threshold if the queue becomes too long. Moreover, this approach does not require a communications network to inform a user as to whether they are able to access a resource. Users benefit in that the attraction queues can be kept relatively short and their waiting time to access an attraction is therefore spent mostly outside a physical queue. This makes the users' queuing experience less boring.

However, this newer approach relies on the thresholds for each attraction being set appropriately. Any errors in the thresholds can make the access queue too long and cause problems for both the operator and users. Controlling the eligibility threshold is therefore a continuing challenge.

SUMMARY OF THE INVENTION

Against this background and in a first aspect, there is provided a system for regulating access to a resource (or management of a queue for the resource) by a plurality of users. The system comprises: a plurality of portable access keys, each portable access key being provided to one of the plurality of users and having an eligibility level associated therewith; a standard access queue allowing access to the resource by all users at a standard access rate (the rate of users accessing the resource via the standard access queue); a premium access barrier allowing access to the resource at a premium access rate (the rate of users accessing the resource via the premium access queue)for users in a premium access queue, separate from the standard access queue; and a queue manager. The queue manager is arranged to manage the premium access queue by: receiving a request from a user wishing to access the resource via the premium access queue; allowing the user to access the resource via the premium access barrier if the eligibility level associated with the user's portable access key meets an eligibility threshold; determining an access queue characteristic related to a number of users in the premium access queue; and setting the eligibility threshold based on the determined access queue characteristic.

This approach improves on the previous eligibility-based methodology that the inventors proposed. The premium access queue is operated in a similar way to the previous eligibility-based methodology. However, a standard access queue is also provided, which all users can use irrespective as to whether they have a portable access key or not. In other words, this approach divides the people who wish to access the attraction into two groups, as in earlier systems. Advantageously, this approach reduces necessary variation in the premium access eligibility threshold and therefore makes it easier to control. Moreover, it also provides users with a choice for accessing an attraction, as either the standard or premium access queues may be used. This further improves the user interaction with the system.

In a second aspect, a system for regulating access to a resource by a plurality of users is provided. This comprises: a plurality of portable access keys, each portable access key being provided to one of the plurality of users and having an eligibility level associated therewith; a premium access barrier allowing access to the resource at a premium access rate for users in a premium access queue; and a queue manager. The queue manager is arranged to manage the premium access queue by: receiving a request from a user wishing to access the resource via the premium access queue; allowing the user to access the resource via the premium access barrier if the eligibility level associated with the user's portable access key meets an eligibility threshold; determining an access queue characteristic, identifying whether there are any users in the premium access queue; and setting the eligibility threshold by increasing the eligibility threshold when the access queue characteristic identifies that there are users in the premium access queue and decreasing the eligibility threshold when the access queue characteristic identifies that there are no users in the premium access queue.

Thus, an improved control strategy for the premium access queue is proposed. If the premium access queue is empty, the eligibility threshold is reduced. However, if there are any people in the queue, the eligibility threshold is increased. This approach therefore forces the premium access queue to empty at regular intervals and avoids the queue from ever becoming too long. It is also much simpler to implement than strategies suggested before, which included using a Proportional-Integral-Derivative (PID) controller.

The first and second aspects can be advantageously combined. In other words, the system according to the second aspect may further comprise a standard access queue, allowing access to the resource by all users at a standard access rate. This has significant synergistic benefits, because the control strategy of the second approach can lead to the eligibility threshold regularly reaching a high level. In particular, when the size of the premium access queue reaches a maximum value, the eligibility threshold may increase at the same rate as the rate of increase of each eligibility level associated with a portable access key. This would assist to dissuade any new people from joining the premium access queue, as it would be clear that the eligibility level associated with their portable access key would not reach the eligibility threshold of the premium access queue.

Precise control of the eligibility threshold can be carried out in a number of ways. Beneficially, the queue manager is configured to decrease the eligibility threshold at a predetermined decrease level per update time period when the queue manager determines that there are no users in the premium access queue. Advantageously, the queue manager is configured to decrease the eligibility threshold at a predetermined decrease level per update time period whether or not the sensor determines that there are users in the premium access queue. The update time period is preferably the length of time between updates of the eligibility threshold and optionally the eligibility level as well. This is typically one minute, but it can be less than one minute (30 seconds, for example) or more than one minute (for instance, 2, 3, 4, 5, 10, 15, 20, 25, 30, 45 or 60 minutes, depending on the system). The eligibility threshold is preferably not decreased when it is determined to be zero.

More preferably, the eligibility level associated with each of the plurality of portable access keys is increased at a rate equivalent to 1 unit per update time period. Thus, an increase of 1 unit per update time period for the eligibility threshold should also assist to dissuade new people from joining the premium access queue. The increase in eligibility level of 1 unit per update time period is preferably applied to all portable access keys at the same time. Optionally, portable access keys may be provided with a different rate of increase in their associated eligibility level. Preferably, the eligibility level associated with each of the plurality of portable access keys is changed whether or not the user is in the premium access queue. In an alternative embodiment, the eligibility level associated with each of the plurality of portable access keys is not changed when the user is in the premium access queue, the standard access queue or both. This may act as a disincentive to join a long physical queue.

Advantageously, the queue manager is further configured to increase the eligibility threshold by (1+K)/P when it (optionally using a sensor) determines that a user passes through the premium access queue, where K is the predetermined decrease level and P is a maximum allowed throughput for the premium access queue per update time period. It is preferable that the queue manager is configured to prevent more than P users passing through the premium access queue during an update time period. This may be effected by means of a physical barrier. It is further preferred that the queue manager is configured to limit any increase in the eligibility threshold level to no more than the increase in the eligibility level per update time period, most preferably no more than 1 unit per update time period. This may be implemented irrespective of the value of K and may avoid any unexpected problems when the eligibility threshold begins to rise faster than the rate of increase from the eligibility.

Beneficially, the predetermined decrease level is selected in order to set the access rate for the standard access queue. Preferably, the predetermined decrease level is set as $$K = \frac{1}{\left(\frac{1}{R} + 1\right) \cdot \frac{P}{T} - 1},$$

wherein T is the total throughput of the resource per minute and R is an interleave ratio, the interleave ratio being the ratio of the premium access rate to the standard access rate. Thus, K can be set in order to effect a desired interleave ratio, once a specific value for P and T are known.

The invention according to any aspect can be implemented in a number of different ways. In a first implementation, the premium access queue is a virtual (electronic) queue. Then, each portable access keys may comprise a communications portion, configured to allow the user to communicate a request for a number of people to access the resource via the premium access queue to the queue manager. This may be a transmitter (for example, RF or optical) or another electronically readable portion, such as a barcode, QR code or RFID. A communications location or docking station may be used to communicate the request, especially where a transmitter is not employed. Moreover, the queue manager may be further configured to manage the premium access queue as a virtual queue. This may comprise maintaining a queue sequence, or simply maintaining a number of previous reservations. The queue manager may be further configured to communicate to each user when they can access the attraction by virtue of their position in the premium access queue, for example by informing the user when their position is at the front of the queue or by estimating the time when the user's position will be at the front of the queue and communicating this to the user when they make the request. Then, the queue manager may be further configured to control the premium access barrier such that it allows the user of a portable access key to access the resource from the communicated time. In this approach, it should be noted that users cannot join the premium access queue until their eligibility level meets the eligibility threshold. This implementation is advantageously employed using portable access keys formed using software operated on a portable computer or mobile telephone, as the communication portion of the portable access keys is already a part of the device.

In an alternative, but currently preferred implementation, the premium access queue is a physical queue. Then, the system may further comprise a sensor, arranged to determine the access queue characteristic from a physical quantity. The system may additionally comprise a detector, located at the premium access barrier and adapted to determine the eligibility level of a portable access key when the portable access key is brought into the vicinity of the detector. The sensor and detector may optionally be combined, for example such that the access queue characteristic is established by identifying portable access keys at the premium access barrier. Additionally or alternatively, the queue manager may be further arranged to control the premium access barrier such that it allows the user of a portable access key to access the resource if the corresponding eligibility level determined by the detector meets the eligibility threshold. In this way, the request to access the resource may not be received at the queue manager until the portable access key is detected at the premium access barrier.

It is desirable for the eligibility level associated with the portable access key of the user accessing the attraction to be reduced. Preferably, this reduction should be by at least the eligibility threshold, but the reduction could be set in order to set the eligibility level to zero. This reduction could be implemented in a number of ways. In the implementation where a physical premium access queue is used, the premium access barrier may be located at the start of the premium access queue. The detector at the premium access barrier may then be used to determine whether the premium access queue is empty or the number of people in the premium access queue. Optionally, the sensor may be provided by the detector.

Moreover, the system may further comprise a premium entrance barrier, located at the end of the premium access queue, such that the premium access queue is defined between the premium access barrier and the premium entrance barrier. In this case, the system may be further configured such that the eligibility level associated with the portable access key of a user passing through the premium entrance barrier is decreased. The detector at the premium entrance barrier may then be used to determine whether the premium access queue is empty or the number of people in the premium access queue. Beneficially, this may be provided in conjunction with the detector at the premium access barrier. Optionally, the sensor may be provided by the detector at the premium access barrier and the detector at the premium entrance barrier.

In the preferred embodiment, the premium access barrier may be located at the end of the premium access queue. Then, the system may be further configured such that the eligibility level associated with the portable access key of a user passing through the premium access barrier is decreased.

In approaches where a standard access queue is used, the system may further comprise a standard access barrier located at the end of the standard access queue. Then, the system is optionally further configured such that the eligibility level associated with the portable access key of a user passing through the standard access barrier is decreased by at least the eligibility threshold. Such a system might be employed in implementations where every user has a portable access key. In implementations where not every user has a portable access key, this feature is less desirable.

In another embodiment, the premium access barrier is located at the end of the premium access queue and the system further comprises: a premium queuing barrier, located at the start of the premium access queue. Then, the system may further comprise: a queuing barrier detector, located at the premium access barrier and adapted to identify a portable access key when the portable access key is brought into the vicinity of the queuing barrier detector. The queue manager may be further arranged to control the premium queuing barrier such that it allows the user of a portable access key to enter the premium access queue if the portable access key is identified by the queuing barrier detector. The premium queuing barrier may then be used to determine whether the premium access queue is empty or the number of people in the premium access queue. Beneficially, this may be provided in conjunction with the detector at the premium access barrier. Optionally, the sensor may be provided by the queuing barrier detector.

The invention may be provided in another aspect in a method for regulating access to a resource by a plurality of users. Each user is provided with a respective portable access key having an eligibility level associated therewith. The method comprises: allowing all users to access the resource via a standard access queue at a standard access rate; receiving a request from a user wishing to access the resource via a premium access queue, the premium access queue being separate from the standard access queue and allowing access to the resource at a premium access rate via a premium access barrier; allowing the user to access the resource via the premium access barrier if the eligibility level associated with the user's portable access key meets an eligibility threshold; determining an access queue characteristic related to a number of users in the premium access queue; and setting the eligibility threshold based on the determined access queue characteristic.

In a yet further aspect, the present invention may be found in a method for regulating access to a resource by a plurality of users. Each user being provided with a respective portable access key having an eligibility level associated therewith. The method comprises: receiving a request from a user wishing to access the resource via a premium access queue, the premium access queue allowing access to the resource at a premium access rate via a premium access barrier; allowing the user to access the resource via the premium access barrier if the eligibility level associated with the user's portable access key meets an eligibility threshold; determining an access queue characteristic, identifying whether there are any users in the premium access queue; and setting the eligibility threshold by increasing the eligibility threshold when the access queue characteristic identifies that there are users in the premium access queue and decreasing the eligibility threshold when the access queue characteristic identifies that there are no users in the premium access queue. Preferably, this method further comprises: allowing all users to access the resource via a standard access queue at a standard access rate; controlling the premium access barrier so as to set the standard access rate.

It will be understood that either or both of these method aspects can optionally comprise steps or features used to carry out any of the actions described in connection with the system detailed above. Also, any combination of the individual apparatus features or method features described may be implemented, even though not explicitly disclosed.

In a yet further aspect, the present invention may be found in a computer program, configured when operated by a processor to carry out any of the methods disclosed herein. Alternatively, the present invention may be embodied in programmable logic, configured upon operation to carry out any of the methods disclosed herein.

BRIEF DESCRIPTION OF THE DRAWINGS

The invention may be put into practice in various ways, one of which will now be described by way of example only and with reference to the accompanying drawings in which:

FIG. 1 shows a first embodiment in accordance with the disclosure.

DETAILED DESCRIPTION OF A PREFERRED EMBODIMENT

Referring first to FIG. 1, there is shown a first embodiment according to the disclosure. Each user is provided with a portable module 10 (or portable access key), which is preferably mounted on a wrist-band. The user wishes to visit attraction 50, which may be one of a plurality of attractions within a visitor location such as an amusement park. Two queues are provided: a standard access queue 45; and a premium access queue 40. For the premium access queue 40, a premium access barrier 30 is provided and for the standard access queue 45, a standard access barrier 31 is provided. A detector 35 is placed at the premium access barrier 30. The premium access queue 40 and the standard access queue 45 can be further defined by other fences or barriers. A controller 60, which can also be referred to as a queue manager, controls the premium access barrier 30 and the standard access barrier 31 and also provides an output to an information display 70. The controller 60 also receives inputs from the attraction 50 and detector 35.

In many respects, the portable module 10, premium access queue 40 and controller 60 operate essentially as described in WO-2010/055286, WO-2011/141561, US-2010/117790 and US-2010/0277276. However, the standard access queue 45 is provided in addition. The additional system components and operation will be described below.

Users wishing to use the attraction 50 must either join the standard access queue 45 and pass through the standard access barrier 31 or join the premium access queue 40 and pass through the premium access barrier 30 before reaching the attraction 50. Both of the premium access barrier 30 and the standard access barrier 31 each have at least two states: a first, open state in which users can pass through the barrier; and a second, closed state, in which the barrier prevents users from passing though.

All users (patrons in the visitor location) may use the standard access queue 45 and pass through the standard access barrier 31 to the attraction 50. The state of the standard access barrier 31 is controlled by controller 60 though, in order to regulate the access rate via the standard access queue 45. Also, access to the attraction 50 may only be allowed at specific times. For example, the attraction may be a ride and access may only be allowed when the ride is in a stationary position at a station adjacent the standard access barrier 31 and premium access barrier 30, waiting to receive passengers.

The state of the premium access barrier 30 is also controlled by controller 60. The premium access barrier 30 comprises a detector 35.

Each portable module 10 comprises a processor 11, a memory 12, a transceiver 13, and a display 14. The memory 12 stores the eligibility level (which is a variable access parameter) associated with that portable module 10. At the start of each day (or when the user is first issued the portable module on that day), the eligibility is set to zero. The display 14 is configured to display the eligibility level, which is a number. The transceiver 13 transmits an identifier, which is unique to that portable module 10. The transmitter 13 also transmits the access parameter and number of users associated with the portable module 10. This is implemented using RFID technology.

The portable module processor 11 manages the eligibility level, which is increased with increasing time. For instance, for each minute that the portable module processor is operative, the eligibility level is increased by one unit.

When the detector 35 receives the transmission of a unique identifier and an eligibility level from a portable module 10, it passes this information to controller 60. Controller 60 compares the eligibility level against an eligibility threshold, which again is a number. If the eligibility threshold is met (such that the eligibility level is at least the eligibility threshold) and if there is capacity available on the attraction, the controller 60 then sets the premium access barrier 30 to its open state to allow the user carrying the portable module 10 to pass through. Once a sensor detects that the user has passed through, the premium access barrier 30 is closed again. If the eligibility threshold is not met, the premium access barrier 30 is not opened and remains in its closed state.

When the controller 60 determines the presence of a portable module 10 and establishes that its eligibility level meets the eligibility threshold, the portable module transceiver 13 receives a transmission from detector 35 that the premium access barrier 30 is opened, and in consequence, the portable module processor 11 reduces the eligibility level by the eligibility threshold.

A mechanism for setting the eligibility threshold will now be described. Controller 60 monitors the premium access queue 40 using the detector 35 at the premium access barrier 30. In particular, it determines whether there are any people in the premium access queue 40 or more specifically whether there are any people exiting the premium access queue 40. Whether there are people in the premium access queue 40 or not, the eligibility threshold is decreased at a reduction rate, K, unless the eligibility threshold falls to zero, in which case it should remain at zero.

The maximum allowed throughput of the premium access queue 40, P (in people per minute), and the total attraction throughput, T (in people per minute), are both well defined. These occur whenever there are sufficient guests available. Then, the eligibility threshold can be calculated in the following way.

For each guest who passes through the premium access barrier 30, (1+K)/P units are added to the eligibility threshold. However when there are people in the premium access queue 40, any increase in the eligibility threshold is limited to no more than 1 credit per minute. This may allow for the possibility that the value of P may be an underestimate. It is also desirable to use a value of P towards the lower limit of its uncertainty range to prevent the eligibility threshold from increasing at slightly less than 1 unit per minute when the premium access queue 40 is not empty.

The eligibility threshold reduction rate K is set such that the average arrival rate to the premium access queue 40, S (in people per minute), which results in no net change to the eligibility threshold, sets a desired long term interleave ratio, R. The interleave ratio is expressed as a fraction, with the premium access rate (the number of people from the premium access queue 40 accessing the attraction per minute) as the numerator and the standard access rate (the number of people from the standard access queue 40 accessing the attraction per minute) as the denominator. During a period of one minute, K can therefore be determined based on the following:

$$\frac{S\cdot(1+K)}{P}-K=0.$$

This value of S implies an interleave ratio (R) equal to S/(T−S). Solving for K and eliminating S gives the following expression.

$$K=\frac{1}{\left(\frac{1}{R}+1\right)\cdot\frac{P}{T}-1}$$

It should be noted that if P=T (that is, the entire capacity of the ride is given over to the servicing of the premium access queue 40 when sufficient people are available), this expression reduces to K=R, or the eligibility threshold reduction rate is equal to the desired long term interleave ratio.

Only a proportion of the total number of people in the visitor attraction have a portable module 10. These users can join either the premium access queue 40 or the standard access queue 45. Other people (not having a portable module 10) can only join the standard access queue 45. The desired interleave ratio for each attraction is typically chosen such that it is significantly greater than the ratio of the number of people in the visitor attraction having a portable module 10 to the number of people in the visitor attraction not having a portable module or the proportion of the total number of people in the visitor attraction having a portable module 10.

The system is replicated for multiple attractions, which may have different throughputs (T) and different maximum allowed throughput for their premium access queue 40 (P). They may consequently have one or both of: a different eligibility threshold reduction rate (K); and a different desired interleave ratio (R). Then, the eligibility threshold for each attraction is likely to be different.

From the user's perspective, the system is almost the same as that described in WO-2010/055286, WO-2011/141561, US-2010/117790 and US-2010/0277276. However, the way the eligibility threshold is changed in the implementation now described should be relatively understandable by users in comparison with the access criteria set by other existing implementations. Indeed, it is desirable that users know how the eligibility threshold changes, and in particular that it increases at the same rate that their eligibility levels accumulate, if the premium access queue is not empty. Thus, there is no point in joining a premium access queue if their eligibility level fails to meet the eligibility threshold. It is up to the user to assess the queue lengths, to compare their eligibility level with the eligibility threshold and then decide whether to join the premium access queue or standard access queue or to come back later.

Whilst a preferred embodiment has been described above, the skilled person will recognise that the present invention can be implemented in a large number of alternative ways. Some of these have been discussed in WO-2010/055286, WO-2011/141561, US-2010/117790 and US-2010/0277276.

The eligibility threshold and eligibility levels may be updated at regular time intervals, such as each minute or they may be updated as events take place, such as changes in the premium access queue 40, each portable module 10 or both.

The eligibility level of a portable module passing through the premium access barrier 30 may be set to zero or reduced by the eligibility threshold or some other value. This value may be dependent on one or more of: the eligibility threshold level; the current time; the nature of the attraction; the weather; and the total number of users in the visitor location. Alternatively, the eligibility level may be reduced when the user passes through another location.

In one variation, every person within the visitor attraction has a portable module 10 and can join either the premium access queue 40 or the standard access queue 45. A starting point for the desired interleave ratio for each attraction in the visitor location could be 1. This could be reduced if, for instance, it is desired to give more capacity on the attraction to people who are prepared to physically stand in line (in other words, use the standard access queue 45). Alternatively, it might be increased if it is desired to reduce the proportion of time that the average person spends queuing. The selection of the optimum interleave ratio may be a compromise, as will be discussed below.

In such approaches, there may be some further scope for influencing the behaviour of users, by modifying the eligibility level for users when passing through the standard access barrier 31. Some possible ways of doing this are discussed below. In each case, the goal is provide additional deterrence to guests from joining a large standard access queue 45.

In a first approach, the eligibility level for a user when passing through the standard access barrier 31 is reduced by the current eligibility threshold for the attraction. If the eligibility level for the user is less than the eligibility threshold, the user can still pass through the standard access barrier 31 but will be left with a negative eligibility level. In theory, this would give a user no net benefit in using the standard access queue 45 if they wished to use a priority access queue 40 subsequently. A group of two or more users could get around this by swapping their portable modules, and putting the entire deficit in eligibility level onto a single portable module.

In a second approach, the eligibility level for a user when passing through the standard access barrier 31 is reduced by the current eligibility threshold for the attraction or reduced to zero, whichever is greater. If the eligibility level for the user is less than the eligibility threshold, the user can still pass through the standard access barrier 31 but is left with an eligibility level of zero.

In a third approach, the eligibility level of a portable module for a user is prevented from increasing during the time that the user is waiting in the standard access queue 45. This may require an additional barrier to be placed at the entrance to the standard access queue 45. This may have the undesired consequence of encouraging users to form a queue at this additional barrier, only passing through when they can see that the standard access queue is almost empty.

The determination of the eligibility threshold described in the preferred embodiment desirably uses a continuous measure of whether or not there are people waiting in the priority access queue 45. There are a number of practical ways of performing this measurement, one of which has been discussed above, but others are possible. For example, a separate sensor or combination of technologies might be used to determine the presence of at least one person in the priority access queue 40. This might be a camera. If each portable module 10 comprised position determining means, these may be used to report the location of the portable module 10 within or outside the premium access queue 40 to a central server. The central server can thereby determine the status of the premium access queue 40.

Different configurations of barriers are possible. For example, an additional barrier may be provided at the entrance to the priority access queue 40, for example as described in WO-2010/055286, WO-2011/141561, US-2010/117790 and US-2010/0277276. This could be used to estimate the number of people in the premium access queue 40. If the queue is determined to be empty then the eligibility threshold should be reduced at the eligibility threshold reduction rate, otherwise it should be increased at 1 unit per minute. This additional barrier could also block guests with insufficient credits from joining the priority queue. This barrier could have an additional detector. In one approach, this detector could be used to determine whether the eligibility level of the presented portable module 10 meets the eligibility threshold. Then, the detector 35 premium access barrier 30 need not have such functionality, although it could have that functionality as well. Indeed, if the barrier at the entrance to the premium access queue 40 has all of the functionality of the premium access barrier described above, there may be no need for the premium access barrier 30. Alternatively, a detector at the additional barrier could just check to see that a valid portable module 10 was presented and opens if so, leaving the check on eligibility level to be carried out at the premium access barrier 35 as described above.

Although in the system above each user is provided with an individual portable module, alternatively, a group of users may be provided with a single portable module 10 and the portable module 10 stores the number of users associated with it in its memory 12. Then, the portable module can transmit this information to detector 35 as appropriate, such that the controller 60 is able to determine the number of users in the premium access queue 40.

The skilled person will understand that each portable access key need not have an associated unique identifier. For example, multiple portable access keys may share a common identifier, which can be detected to cause the premium access barrier 30 to open. The common identifier may be one or more of: a number; text; a data sequence; a code; an image; or a sound, and it may be detected using one or more of: wireless; audio; optical; or wired communication.

It is understood that the premium access barrier 30 may be opened in an automatic fashion, for example using electronic control with motors. Alternatively, the respective open and closed states may simply be indicated to an operator, who manually opens and closes the barrier accordingly. Indeed, a physical barrier need not be provided. Similarly, the premium access barrier 30 need not be required to receive a unique identifier before opening. Detection of a portable module 10 may be sufficient.

Possible options for the portable module may include a mobile or cellular telephone (including so-called a smartphone), portable digital assistant, an electronic watch. Such devices may be enabled to act as an portable module or access key when provided with suitable software in order to facilitate some of the features of the present invention. Their existing functionality may also be sufficient. Alternatively, a badge, a ring, a wristband or device carried in a pocket could be employed. It will be recognised that some embodiments of the present invention require the portable access key to include electronic communication means, whilst other embodiments do not. Similarly, some embodiments of the present invention require the portable access key to include means readable by electronic systems, whilst other embodiments do not.

As discussed in WO-2010/055286, WO-2011/141561, US-2010/117790 and US-2010/0277276, an alternative, but functionally equivalent variant of the present invention may be implemented using paper tickets instead of portable modules. In an alternative embodiment, the portable module provided to the user need not specifically indicate the eligibility level. Instead, they may provide only a unique identifier; the eligibility level associated with that access key being stored and updated in a central server. Terminals may be provided at which users could use their portable modules to determine which attractions their current eligibility level would make accessible via their premium access queues.

Approaches in accordance with WO-2011/141561, US-2010/0277276 may also be employed in which the premium access queue is not a physical queue but a further virtual queue. Users with an eligibility level that meets the eligibility threshold for the attraction indicate using their portable module that they wish to access the attraction. They are then registered in a virtual queue and their portable module informs them of a time at which they can access the attraction. At that time, they simply arrive at an entrance to the attraction and access it, with a very short if at all existent physical queue. It is the size of the virtual queue that is used for determining the eligibility threshold. The time may be determined deterministically or a statistical approach such as described in US-A- 2008/0080445 (which shares common inventors with the present invention) may be used.

Some behavioural considerations relating to the disclosure will now be discussed. The original idea behind the introduction of virtual queuing systems in visitor locations such as amusement parks was to reduce the time that patrons spend standing in line. However for many patrons, there is nothing better to do in a visitor location, than to stand in line and use attractions. If these patrons use a virtual queuing system for some attractions, they will simply use the time gained to physically stand in line and use other additional attractions. So they will spend just as much time queuing as before, but may get access to additional attractions.

For a premium system, where a minority of the patrons pay an additional fee to use the virtual queuing system, this behaviour is quite acceptable. For a system where 100% of the patrons have a portable module and no physical queues are provided (such as a standard access queue 45), patrons would be prevented from physically standing in line. However, this introduces two problems. The first is that the deterrent effect of the physical queue has been removed, so patrons who are eager to access attractions, and who would have been prepared to endure long waiting times, get access to no more attractions than patrons who are not so interested. This is likely to reduce the average patron's enjoyment level.

The second problem is that there is nothing else to do with the time that has been saved that is as attractive as the combination of standing in line then visiting the attraction (for example, going on a ride). If there were something else sufficiently attractive to do, then the patrons might have been doing it before the introduction of the virtual queuing system, and the physical queues would have been shorter then.

The invention claimed is:

1. A system for regulating access to a resource by a plurality of users, comprising:

a plurality of portable access keys, each portable access key being provided to one of the plurality of users and having an eligibility level associated therewith;

a standard access queue allowing access to the resource by all users at a standard access rate;

a premium access barrier allowing access to the resource at a premium access rate for users in a premium access queue; and a queue manager, arranged to manage the premium access queue by receiving a request from a user wishing to access the resource via the premium access queue, allowing the user to access the resource via the premium access barrier if the eligibility level associated with the user's portable access key meets an eligibility threshold, determining an access queue characteristic, identifying whether there are any users in the premium access queue and setting the eligibility threshold by increasing the eligibility threshold when the access queue characteristic identifies that there are users in the premium access queue and decreasing the eligibility threshold when the access queue characteristic identifies that there are no users in the premium access queue.

2. The system of claim 1, wherein the queue manager is configured to decrease the eligibility threshold at a predetermined decrease level per update time period when the queue manager determines that there are no users in the premium access queue, the eligibility threshold not being decreased when it is determined to be zero.

3. The system of claim 2, wherein the predetermined decrease level is selected in order to set the standard access rate.

4. The system of claim 2, further comprising:

a standard access queue allowing access to the resource by all users at a standard access rate;

a standard access barrier located at the end of the standard access queue, the system being further configured such that the eligibility level associated with the portable access key of a user passing through the standard access barrier is decreased by at least the eligibility threshold.

5. The system of claim 2, configured such that the eligibility level associated with each of the plurality of portable access keys is increased at a rate equivalent to 1 unit per update time period.

6. The system of claim 5, further configured such that the eligibility level associated with each of the plurality of portable access keys is not changed when the user is in the premium access queue or the eligibility level associated with each of the plurality of portable access keys is not changed when the user is in the standard access queue or the eligibility level associated with each of the plurality of portable access keys is not changed when the user is in the standard access queue or the premium access queue.

7. The system of claim 5, wherein the queue manager is further configured to increase the eligibility threshold by (1+K)/P when it determines that a user passes through the premium access queue, where K is the predetermined decrease level and P is a maximum allowed throughput for the premium access queue per update time period.

8. The system of claim 7, wherein the predetermined decrease level is set as $$K = \frac{1}{\left(\frac{1}{R}+1\right)\cdot\frac{P}{T}-1},$$

wherein T is the total throughput of the resource per minute and R is an interleave ratio, the interleave ratio being the ratio of the premium access rate to the standard access rate.

9. The system of claim 7, wherein the queue manager is configured to prevent more than P users passing through the premium access queue during an update time period.

10. The system of claim 7, wherein the queue manager is configured to limit any increase in the eligibility threshold level to no more than 1 unit per update time period.

11. The system of claim 1, wherein each portable access keys comprises a communications portion, configured to allow the user to communicate a request for a number of people to access the resource via the premium access queue to the queue manager; and wherein the queue manager is further configured to manage the premium access queue as a virtual queue, to communicate to each user when they can access the attraction by virtue of their position in the premium access queue and to control the premium access barrier such that it allows the user of a portable access key to access the resource from the communicated time.

12. The system of claim 1, further comprising:

a sensor, arranged to determine the access queue characteristic from a physical quantity;

a detector, located at the premium access barrier and adapted to determine the eligibility level of a portable access key when the portable access key is brought into the vicinity of the detector; and wherein the queue manager is further arranged to control the premium access barrier such that it allows the user of a portable access key to access the resource if the corresponding eligibility level determined by the detector meets the eligibility threshold.

13. The system of claim 12, wherein the premium access barrier is located at the start of the premium access queue, the system further comprising:

a premium entrance barrier, located at the end of the premium access queue, such that the premium access queue is defined between the premium access barrier and the premium entrance barrier; and wherein the system is further configured such that the eligibility level associated with the portable access key of a user passing through the premium entrance barrier is decreased by at least the eligibility threshold.

14. The system of claim 12, wherein the premium access barrier is located at the end of the premium access queue, the system being further configured such that the eligibility level associated with the portable access key of a user passing through the premium access barrier is decreased by at least the eligibility threshold.

15. The system of claim 14, further comprising:

a premium queuing barrier, located at the start of the premium access queue; and a queuing barrier detector, located at the premium access barrier and adapted to identify a portable access key when the portable access key is brought into the vicinity of the queuing barrier detector; and wherein the queue manager is further arranged to control the premium queuing barrier such that it allows the user of a portable access key to enter the premium access queue if the portable access key is identified by the queuing barrier detector.

* * * * *